G. F. STRUBE.
ARTIFICIAL BAIT.
APPLICATION FILED FEB. 16, 1916.
1,204,204.
Patented Nov. 7, 1916.
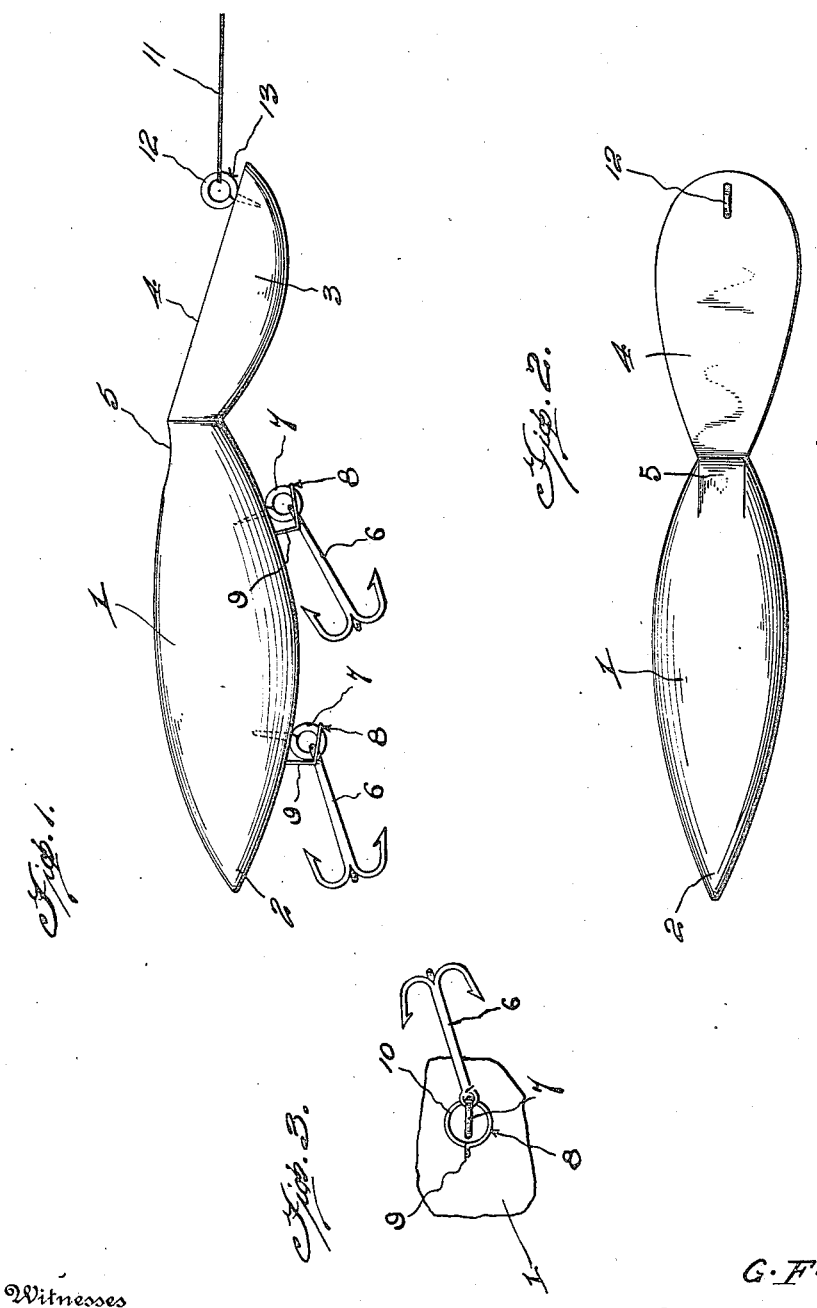
Witnesses
R.H. Veihmeyer.
Robt Meyer.
Inventor
G. F. Strube.
By
Attorney

UNITED STATES PATENT OFFICE.

GEORGE F. STRUBE, OF CHICAGO, ILLINOIS.

ARTIFICIAL BAIT.

1,204,204. Specification of Letters Patent. Patented Nov. 7, 1916.

Application filed February 16, 1916. Serial No. 78,646.

*To all whom it may concern:*

Be it known that I, GEORGE F. STRUBE, a citizen of the United States, residing at Chicago, in the county of Cook and State of Illinois, have invented certain new and useful Improvements in Artificial Bait; and I do hereby declare the following to be a full, clear, and exact description of the invention, such as will enable others skilled in the art to which it appertains to make and use the same.

This invention relates to artificial bait or fish lures, adaptable for use in casting or trolling, and the primary object of the invention is to provide a fish lure as specified, which will, upon being drawn through the water, dive downwardly and come up with a peculiar sinuous movement, substantially in the form of an S.

Another object of this invention is to provide artificial bait or a fish lure as specified, which includes a substantially ellipsoidal body having a semi-ellipsoidal forwardly extending projection formed upon its upper end, the upper flat surface of which is inclined downwardly with respect to the horizontal, for causing the lure or bait to dive, and further to loosely connect a plurality of grappling fish hooks to the main body and to provide stops for limiting the movement of the hooks.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved artificial bait. Fig. 2 is a top plan view of the bait, and Fig. 3 is a fragmentary bottom plan of the bait.

Referring more particularly to the drawings, 1 designates the body of the bait or lure, which is substantially an ellipsoidal, having its rear or tail end pointed as is shown at 2. A forwardly extending projection 3 is formed on the forward or head end of the body 1 and is substantially a semi-ellipsoidal, having its upper surface 4 flat and inclined with respect to a horizontal plane as clearly shown in Fig. 1 of the drawings. The upper inclined flat surface 4 of the head or forwardly extending projection 3 of the artificial bait is inclined, so that when the bait is drawn forwardly through the water, it will dive and come upwardly in a jumping sinuous path, for increasing its fascination for fish. The body 1 is provided with a concaved portion 5, formed in its upper surface immediately in the rear of the line of conjunction between the upper portion of the body and the upper flat face 4 of the forwardly extending projection 3, which concaved portion is also provided for facilitating the movement of the bait.

The body 1 has a plurality of grappling fish hooks indicated by the numeral 6, loosely connected to the under surface of the same, by means of eye screws 7, or analogous fastening devices which will permit of a free swinging movement of the hooks. Members 8 are attached to the body 1 and are provided for limiting the movement of the hooks 6 for preventing the hooks from engaging the body 1 during their movement. The members 8 are constructed of wire, and comprise shanks 9, which extend into the body 1. The outer ends of the wires of which the members 8 are formed are bent to form transversely positioned rings 10 which extend about the eyes of the eye screws 7, as clearly shown in Figs. 1 and 3 of the drawings, for engaging the shanks of the hooks 6 for limiting the movement of the hooks toward the body 1.

The line, by means of which the lure or bait is drawn through the water and which is indicated by the numeral 11 is attached to the eye 12 of an eye screw 13 which is secured to the projection 3 adjacent its forward edge.

In reducing the invention to practice certain minor features of construction, combination and arrangement of parts may necessitate alterations to which the patentee is entitled provided such alterations are comprehended within the scope of what is claimed.

What is claimed is:—

1. In an artificial bait, a substantially ellipsoidal body having a tail end pointed, a forwardly extending substantially semi-ellipsoidal projection formed upon the forward end of said body, the upper surface of said projection being flattened and extending downwardly from the point of connection with the body at an incline with respect to a horizontal plane, said body being provided with a concaved portion in its upper surface extending rearwardly from the line of connection between the body and said projection.

2. In an artificial bait structure, the combination, of a substantially ellipsoidal body, a plurality of eye screws attached to said body, a plurality of grappling fish hooks loosely connected to the eyes of said eye screws, wires connected to said body and extending outwardly therefrom, said wires having transversely extending rings formed upon their outer end which encompass the eyes of said eye screws and hooks for limiting the movement of the hooks toward the body.

In testimony whereof I affix my signature in presence of two witnesses.

GEORGE F. STRUBE.

Witnesses:
HENRY REININGER,
HARRY R. BURNS.